United States Patent Office 2,741,008
Patented Apr. 10, 1956

2,741,008

METHOD OF PRODUCING GLAZED CERAMIC OBJECTS

John H. Snoddy, Los Angeles, Calif., assignor to Malinite Corporation, Los Angeles, Calif., a corporation of California No Drawing. Application June 13, 1952,
Serial No. 293,441

2 Claims. (Cl. 25—156)

In the manufacture of dinnerware and artware it is customary to form the objects, subject them to a firing operation to form bisque, then apply a glaze composition or underglaze decoration and again fire the objects to mature the glaze. One to three days is consumed in each firing, and temperatures of 2150°–2300° F. have to be reached in the bisque firing and 1900°–2100° F. in the glost firing.

The manufacture of such ceramic objects can be expedited by the use of body compositions plasticized with clay but high in magnesia content and containing ground glass or similar glassy, alkaline flux. Such bodies can be fired very rapidly because the magnesia is highly conductive of heat and the glass-like binders bond the body quickly. Such bodies can be matured in a continuous kiln on a firing schedule of eight to twelve hours at temperatures of about 1850°–2000° F.

Although the bodies above mentioned can be used in a one-fire process (whereby the body and a glaze are matured at the same time) these bodies present difficulties because they are porous and sponge-like. It has been found that the glazes are absorbed by the bodies and leave a dull, mat surface or, in some instances are absorbed to such extent that dry edges are produced, or no evidence of glazing can be observed.

In addition, the magnesia bearing minerals very tenaciously retain water of crystallization and combination, and gases evolved by the body are not completely removed during the short firing period. As a result, these gases cause scars, blisters and imperfections in the glaze.

This invention provides a body composition capable of being fired very rapidly, as well as glaze compositions compatible with such body, so that both the body and the glaze can be simultaneously matured during a short, single firing without the difficulties heretofore encountered. These desirable objectives are attained, in accordance with this invention, by: (1) the careful preparation of the body, whereby the materials employed fall within a specific molecular relationship hereafter described in detail; (2) by formulating the glaze compositions so that they are compatible with the body, mature at substantially the same temperature as the body, and have a high surface tension which prevent the gases, liberated from the body during the last stages of firing, from producing imperfections, bubbles, blisters, pin holes etc., in the glaze.

In accordance with the present invention, a preferred ceramic composition may be prepared by using 5%–40% by weight of a matrix material, 25%–45% by weight of clay, and a mixture of raw and calcined talc. From 0% to 25% of the entire composition may be composed of raw talc and from about 20% to 65% of the composition may be composed of a calcined talc or a bisque high in magnesia content.

By materials high in magnesia, reference is made here to talc, steatite, tremolite, sepiolite and similar flaky or platy or needlelike magnesium minerals.

By the term "matrix material" reference is made to ground, common glass (bottle or window glass), specially prepared alkaline frits, volcanic glasses such as rhyolite or obsidian, natural minerals high in alkalies, such as sodalite, lepidolite, nephelite and colemanite and rocks such as photolite and syenite. Any clay having adequate plasticity and adaptable shrinkage characteristics, such as ball clay, may be used. These materials are preferably blended in such manner that the resulting body, upon firing and on a dehydrated basis, will contain a specific molecular ratio of components with respect to the alkalies $Na_2O$ and $K_2O$. The preferred body composition on such dry basis should contain 1.0 NaKO, 2.0–8.0 MgO, 1.0–3.5 $Al_2O_3$ and 8.0–22.0 $SiO_2$.

Although the above bodies are particularly adapted for use with the glazes of this invention and are capable of being burned to maturity at temperatures of about 1850°–1950° F. or 2000° F., the glaze compositions hereinafter described will not only fit the bodies hereinabove mentioned but are also of great value as glaze compositions for use on various other bodies adapted for a single firing process.

It has been discovered that when a ceramic body evolves gas during the last stages of firing in a single burn process, the formation of bubbles, blisters, pin holes and other imperfections in the glaze may be prevented by using a glaze of high surface tension. Such glaze, having a high surface tension during its maturing or liquefying state, causes the blisters and bubbles to heal quickly and, after the evolution of gas ceases, the glaze quickly assumes a smooth surface.

It has also been discovered that the penetration or absorption of the glaze by the body can be controlled by regulating the content of alumina in the glaze. In other words, glossy glazes, free from the dull or mat effect, or from scum-like blotches, can be obtained even on difficult bodies by the use of the glaze compositions hereinafter disclosed.

Moreover, it has been found that the dark stains which are left on the glazed surface of coffee cups by coffee, tea and cocoa can be eliminated and prevented from forming by carefully controlling the ratio between alumina and silica in the glaze composition and by confining the molecular ratio of alumina to the alkalies and RO group, to very close limits described hereafter.

Glaze compositions contemplated by this invention are preferably compounded to have a molecular equivalent formula coming within the following ratios:

```
     0.0–0.40 Na₂O
     0.0–0.40 K₂O
     0.0–0.35 MgO         0.18–0.35 Al₂O₃
     0.0–0.60 CaO
RO = 0.0–0.40 Li₂O = 1.0  1.80–3.50 SiO₂
     0.0–0.50 SrO
     0.0–0.50 ZnO         0.20–0.70 B₂O₃
     0.0–0.60 BaO
     0.0–0.60 PbO
``` plus 8 to 24% by weight of zirconium oxide, silicate or other zirconium complex for other than transparent glazes. For purpose of convenience and in view of the common characteristics, "RO" in the above formula includes certain stated bivalent oxides. It is to be noted that the glaze composition is free from phosphorus or $P_2O_5$.

It is to be understood that not all elements of the RO group need be present, and that certain of these elements are more beneficial than others. BaO and $Li_2O$ may replace all of the PbO; if any of these elements are used in proportions in excess of those indicated, the glaze will have a low surface tension and blistering will be obtained. It is therefore desired to keep the amount of $K_2O$, $Na_2O$, PbO and $Li_2O$ to low limits. On the other hand, MgO, CaO, SrO and ZnO may be used in larger amounts, and preferably the total of these oxides should exceed 0.20 in the formula in order to obtain increased resistance to blisters and imperfections.

Unlike previous conventional glaze formulae known, it will be noted that the preferred formula uses alumina in relatively high amounts and thereby develops highly desirable characteristics. Glaze compositions coming within the range given herein will not soak into or be absorbed by a body and will not produce a dry finish, but instead, will result in a full glaze surface.

In order to increase the resistance of the glazes to staining with coffee, tea, etc., the $Al_2O_3$ ratio in the formula given hereinabove is preferably kept between about 0.23 and 0.32 on a molecular basis and, in addition, the ratio between $Al_2O_3$ and $SiO_2$ should be kept between 1:8 or 1:9 and 1:12. By maintaining this particular ratio, the "curtains" or glaze runs of heavy glaze formed from the dipping or draining of glaze before and during firing on the inside of the cups appears to be prevented and a microcrystalline surface effect which appears to be an incipient devitrification does not occur. It is at these "curtains" that staining ordinarily takes place. By maintaining the ratios herein given, such staining is prevented.

When the glaze is to be used on a porous body, it is often desirable to add to the glaze composition from about 8%–24% by weight of a zirconium complex or compound, for example, zirconium oxide, zirconium silicate or other zirconium complex. Preferably the amount of $ZrO_2$ added should be greater than that required to impart opacity to the glaze.

It will be understood that suitable metallic oxides or coloring materials are added to the various glaze compositions in an amount suitable for the development of desired coloring.

Again attention is called to the fact that although these glaze compositions are particularly adapted for use on bodies high in magnesia, they can be used on various types of bodies and are not necessarily limited in their utility to the preferred body compositions referred to hereinabove.

I claim:

1. A method of producing glaze dinnerware, artware and other ceramic objects by the one-fire process without a high incidence of imperfections, bubbles, blisters and pin holes in the glaze, which comprises: making the body of the object from a ceramic composition of the following molecular ratio, to wit: 1.0 $Na_2O$ and $K_2O$; 2.0–8.0 MgO; 1.0–3.5 $Al_2O_3$ and 8.0–22.0 $SiO_2$; and applying to objects made from such composition a glaze having a molecular equivalent formula of 1.0 RO, 0.18–0.35 $Al_2O_3$, 1.8–3.5 $SiO_2$ and 0.2–0.7 $B_2O_3$, said glaze being virtually free from $P_2O_5$.

2. A method of the character stated in claim 1, wherein the glaze composition contains from about 8% to 24% by weight of $ZrO_2$ and has a high surface tension during maturity.

References Cited in the file of this patent

UNITED STATES PATENTS

| | | |
|---|---|---|
| 2,213,495 | Hagar | Sept. 3, 1940 |
| 2,241,705 | Goodrich | May 31, 1941 |
| 2,337,691 | Stettinius et al. | Dec. 28, 1943 |
| 2,537,955 | Baldwin | Jan. 16, 1951 |
| 2,537,956 | Baldwin | Jan. 16, 1951 |
| 2,587,152 | Harlan et al. | Feb. 26, 1952 |

FOREIGN PATENTS

| | | |
|---|---|---|
| 25,853 | Great Britain | of 1903 |
| 81,965 | Switzerland | of 1920 |
| 192,096 | Switzerland | Oct. 1, 1937 |

OTHER REFERENCES

J. H. Koenig et al.: Literature Abstracts of Ceramic Glazes, College Offset Press, 1951, pages 1, 2, 4, 5, 14, 61, 62, 102, 208 and 264.